(No Model.)  2 Sheets—Sheet 1.
R. WÜNSCHE.
POTATO PLANTER.
No. 283,317.  Patented Aug. 14, 1883.
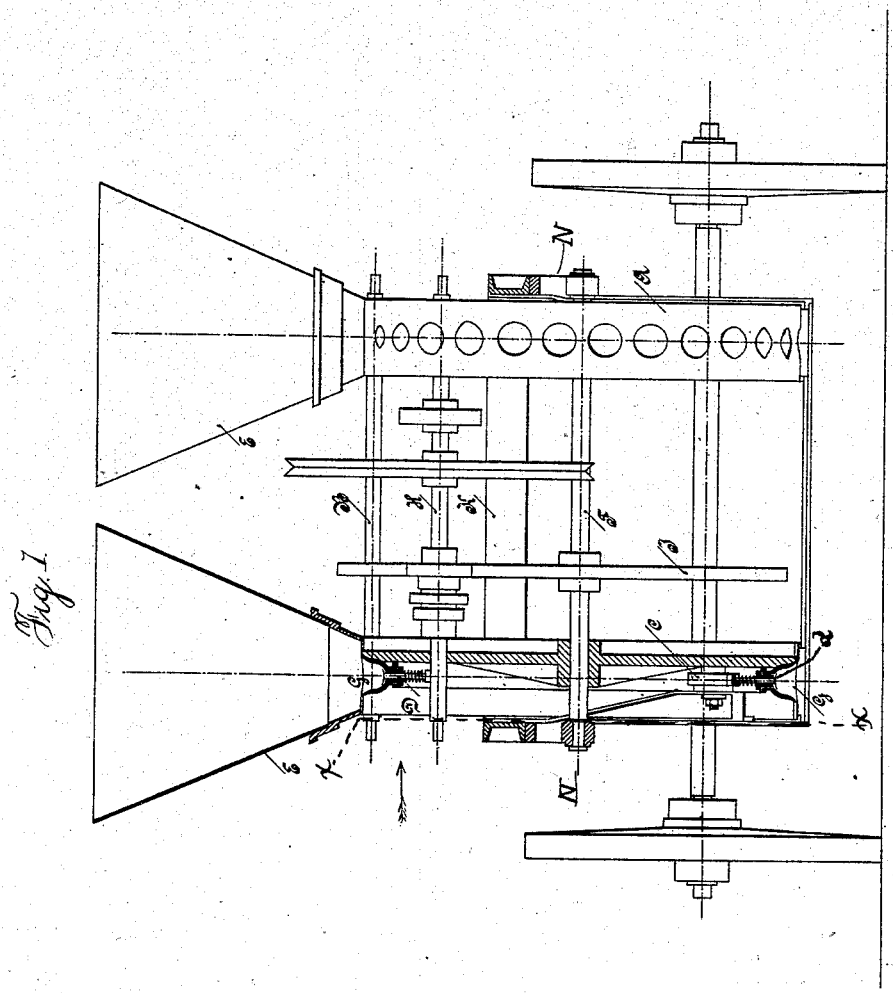
Witnesses:
Chas E Buell
Fred F. Church
Inventor:
Richard Wünsche
by Melville Church
His Atty.

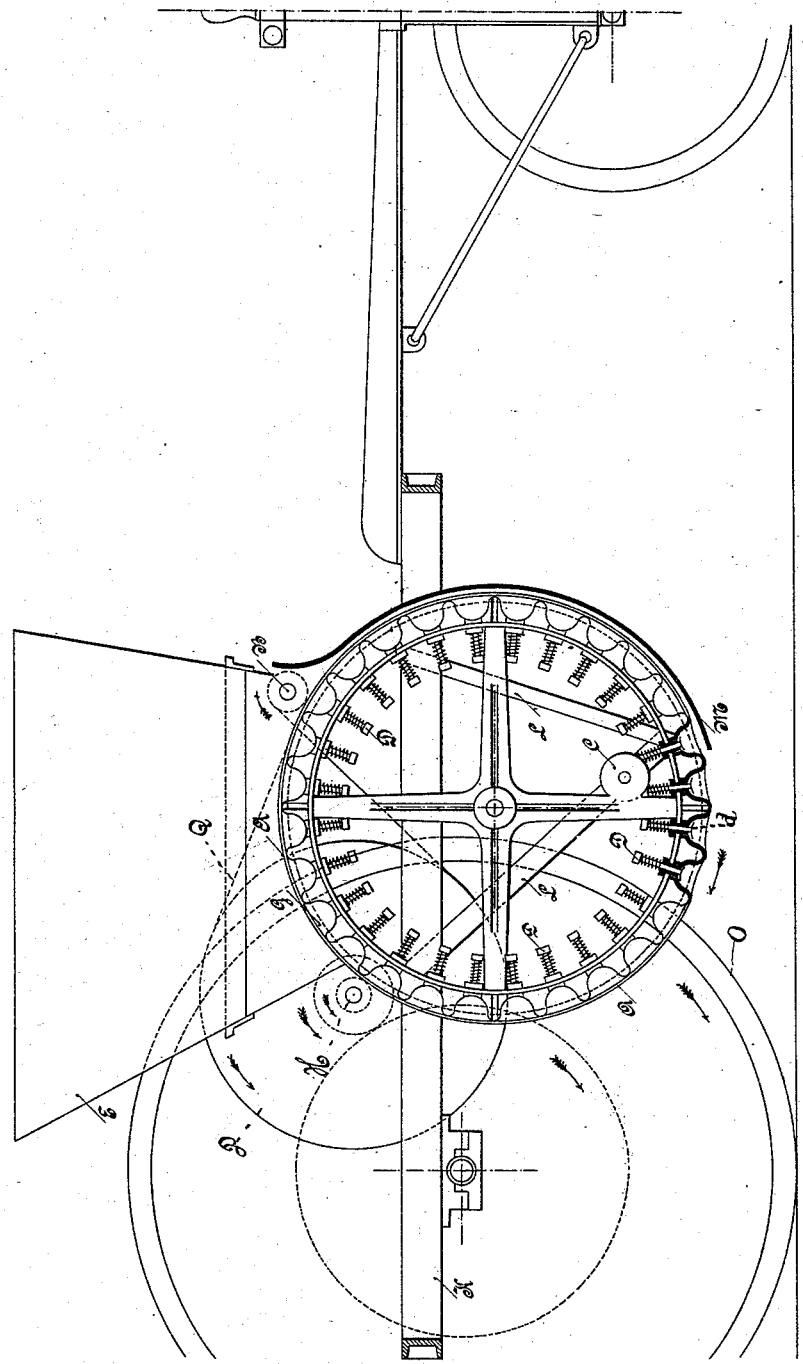

UNITED STATES PATENT OFFICE.

RICHARD WÜNSCHE, OF HERRNHUT, SAXONY, GERMANY.

POTATO-PLANTER.

SPECIFICATION forming part of Letters Patent No. 283,317, dated August 14, 1883.

Application filed February 16, 1883. (No model.) Patented in Germany September 7, 1882, No. 21,849; in England September 21, 1882, No. 4,513, and in Austria-Hungary November 10, 1882.

*To all whom it may concern:*

Be it known that I, RICHARD WÜNSCHE, of Herrnhut, in the Kingdom of Saxony, German Empire, have invented certain new and useful Improvements in Potato-Planters; and I do hereby declare the following to be a full, clear, and exact description of the same, reference being had to the accompanying drawings, forming part of this specification, in which—

Figure 1 is a rear elevation of my improved potato-planter, partly in section. Fig. 2 is a section taken on the line $x\ x$, looking in the direction indicated by the arrow in Fig. 1.

Similar letters of reference in the several figures denote the same parts.

My invention relates to that class of potato-planters in which the seed-potatoes are planted at regular and preferably short distances apart, in rows; and it consists in certain novel details of construction and combinations of parts, which I will first describe, and then point out particularly in the claims at the end of this specification.

In the accompanying drawings the machine is represented as being double—that is, having two hoppers, planting-wheels, &c., for the purpose of planting two rows of potatoes at once, and as the operation of both parts is the same, and a description of one will apply to both, I shall confine myself to the description of one of them. The planting devices are mounted in a frame constructed, preferably, of light cast-iron, and supported by two front and two rear wheels, from the latter of which the operating parts are driven.

A represents the planting-wheel, keyed to the shaft F, which shaft is mounted in bearings supported by bars N, depending from the main frame H. This planting-wheel has a broad flat rim, in which are a number of bell-shaped cavities, G, for conveying the potatoes from the hopper E to a point near the ground, to be there discharged into a furrow made by a share carried at the front of the machine in any suitable manner. At the bottom of each of these cavities there is a perforation extending through the rim of the wheel, and through this perforation extends a bolt or stem, D, having at its outer end a concave plate, $d$, which is adapted to fit closely to the bottom of the cavity. This stem has at its inner end a head, between which and the inner periphery of the wheel a spiral spring encircling the stem is adapted to be placed to keep the plate $d$ normally against the bottom of the cavity. The wheel A works through the bottom of the hopper E, in which the potatoes to be planted are placed, and the potatoes fall into the cavities G in said wheel, and are carried around and discharged near the ground, being prevented from falling out before the proper time by the guard M.

In the lower forward end of the hopper E is a roller, B, for preventing more than one of the potatoes from entering the cavities in the planting-wheel by being revolved in the direction indicated by the arrow in Fig. 2. This roller receives its motion from the wheel O through the medium of shaft H, pulley P, and belt Q, as shown in Fig. 2.

Projecting downward from the main frame are two arms, L and L', supporting near their lower ends a small wheel, C, the operation of which will be hereinafter explained.

The shaft F, carrying the planting-wheels, has secured to it a large gear-wheel, I, which engages with a corresponding gear on the main axle of the machine, and is adapted to be operated thereby.

The operation of the machine is as follows: The potatoes to be planted, preferably nearly of a size, say one inch in diameter, are placed in the hopper E, and the planting-wheel A revolving through the bottom of the hopper, the potatoes will fall into the cavities (more than one in each being prevented by the revolving roller B) and be carried around to nearly the lowest point in the revolution of the planting-wheel, when the potatoes will fall into the furrow, as described; but if a potato larger than the ordinary size has become jammed in the cavity, the end of the stem D, striking the wheel C, pushes the stem and plate D outward, causing such potato to be dropped in the furrow. As soon as this is done the spring around the stem D retracts the stem and plate to their normal positions.

Having thus described my invention, I claim as new—

1. The main frame provided with the depending braces L L', supporting near their lower ends the wheel C, in combination with means, substantially as described, for ejecting the potatoes from the cavities in the planting-wheel, substantially as described.

2. The combination of the hopper E, roller B, planting-wheel A, provided with the bell-shaped cavities G, and the ejecting devices, consisting of the stem D, spring, and concave plate d, substantially as described.

In testimony whereof I have signed my name to this specification in the presence of two subscribing witnesses.

RICHARD WÜNSCHE.

Witnesses:
JOHANNES MAYER,
PAUL DUROR LEMILLER,
   Both of Dresden.